United States Patent
Cha et al.

(10) Patent No.: US 6,339,873 B2
(45) Date of Patent: *Jan. 22, 2002

(54) METHOD AND SYSTEM FOR ASSEMBLING INDOOR UNITS OF AIR CONDITIONERS ALONG CONVEYOR LINES

(75) Inventors: Jae-jin Cha; Doo-nam Myung, both of Kyungki-do (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/233,052

(22) Filed: Jan. 19, 1999

(30) Foreign Application Priority Data

Apr. 2, 1998 (KR) .............................. 98-11692

(51) Int. Cl.[7] ................................. B23P 21/00
(52) U.S. Cl. .............................. 29/783; 29/791; 29/786; 29/793
(58) Field of Search ................. 29/890.035, 430, 29/771, 783, 786, 791, 793, 822, 429, 431, 428, 794; 198/339.1; 414/222.01

(56) References Cited

U.S. PATENT DOCUMENTS

| | | | |
|---|---|---|---|
| 4,069,764 A | * 1/1978 | Teyssedre | 29/430 |
| 4,683,651 A | * 8/1987 | Taketani et al. | 29/786 |
| 4,884,330 A | * 12/1989 | Sticht | 29/783 |
| 5,125,149 A | * 6/1992 | Inaba et al. | 29/771 |
| 5,191,967 A | 3/1993 | Woltjer et al. | |
| 5,271,139 A | * 12/1993 | Sticht | 29/771 |
| 5,353,495 A | * 10/1994 | Terabayashi et al. | 29/783 |
| 5,386,621 A | * 2/1995 | Fluegge et al. | 29/771 |
| 5,727,301 A | * 3/1998 | Kugo | 29/822 |

FOREIGN PATENT DOCUMENTS

DE      25 34 437      2/1977

* cited by examiner

Primary Examiner—I. Cuda Rosenbaum
Assistant Examiner—T. Nguyen
(74) Attorney, Agent, or Firm—Burns, Doane, Swecker & Mathis, L.L.P.

(57) ABSTRACT

Indoor air conditioner units are manufactured by pre-assembling evaporators and supplying the evaporators to a plurality of unit assembling stations, whereby at each unit assembling station, the evaporators are assembled with other air conditioner elements to form finished indoor air conditioner units. The evaporators can be assembled at an evaporator assembling station which supplies all of the unit assembling stations with evaporators. Alternatively, the evaporators can be assembled at each of the unit assembling stations.

4 Claims, 6 Drawing Sheets

METHOD AND SYSTEM FOR ASSEMBLING INDOOR UNITS OF AIR CONDITIONERS ALONG CONVEYOR LINES

BACKGROUND OF THE INVENTION

1. Field of the Invention

The present invention relates to an air conditioner, and more particularly to methods and systems for assembling an indoor unit of an air conditioner.

2. Description of the Prior Art

Generally, industrial products such as an indoor unit of a dual-unit type air conditioner are made by separately manufacturing the parts thereof and then assembling the unit elements.

The process for assembling the products is performed on a linear conveyor system in consideration of manufacturing productivity thereof and convenience in supervising.

Such a conveyor system employs a method which a plurality of workers positioned along the linear conveyor line assemble the elements conveyed thereon.

An example of such a linear conveyor system is shown in FIG. 1 which shows a linear conveyer system on which elements of an indoor unit of a dual-unit type air conditioner are assembled.

As shown, a plurality of workers W are positioned along a long linear assembly line 1 in order to assemble elements of respective units. Opposite to the workers W, a kit box conveying line 2 is disposed. The kit box conveying line 2 functions to convey kit boxes containing elements of respective units along the assembly line 1.

An inspection section 3 for performing quality testing upon the assembled units is positioned at the rear end of the assembly line 1. A packing section 4 for packing the assembled indoor units so as to ship the same is positioned at a rear end of the inspection section 3.

Thus, as kit boxes containing the elements of respective units are conveyed along the kit conveying line 2, workers positioned along the assembly line 1 assemble the elements of respective products. Fully assembled indoor units now undergo the quality testing processes such as a withstand voltage test, a noise test, etc. Then the indoor units are packed at a packing section 4 so as to be shipped.

As described, in the linear conveyor line for manufacturing the indoor unit, a variety of unit processes are performed by the workers. As shown in FIG. 1, twenty-one workers for assembling the indoor unit, three workers for quality tests, and six workers for packing are required. Approximately, forty workers are required for respective processes including a supporting work force such as supervisors, repairmen, etc.

Accordingly, the linear conveyor system is very efficient in manufacturing products if workers are skilled ones.

There is, however, a drawback in that only one kind of product can be manufactured on such a linear conveyor system.

More specifically, if the manufacturer wants to assemble various kinds of products at the same time, the assembly systems corresponding thereto must be equipped, or the assembly line must be changed in accordance with the need of the manufacturer.

Recent trends require that a system capable of manufacturing multiple kinds of products in small quantity is preferred, so the assembly line must be changed quite often in order to meet the varying demands of consumers.

Consequently, a lot of time and funds must be spent on the manufacturing equipments, and manufacturers achieve relatively low productivity compared with the investment they have made. Even more, once the equipment is changed, then the equipment cannot be adopted in manufacturing products which have been previously produced. This means that the manufacturer cannot flexibly deal with the various demands of the customers.

SUMMARY OF THE INVENTION

An object of the present invention is to provide a system for assembling an indoor unit of an air conditioner in which a variety of products are conveniently manufactured in accordance with the demands of a market.

Another object of the present invention is to provide a method for assembling an indoor unit of air conditioner performed by the above-described assembly system.

To achieve the above object, the present invention provides a system for assembling indoor units of dual-unit type air conditioner, the system comprising: an evaporator assembly section for assembling evaporators; and a plurality of unit cells on which evaporators assembled on the evaporator assembly section are assembled with other elements so that indoor units are fully assembled, and inspection and packing processes of indoor units are performed.

It is preferable that said unit cell comprises: a rear body input section for inputting the indoor unit to which rear bodies and elements thereof are assembled; an evaporator fixing section for fixing evaporators assembled at the evaporator assembly section on the indoor units input to the rear body input section; a wiring section for wiring the indoor units assembled at the evaporator fixing section; a front panel fixing section for fixing front panels on the indoor units wired at the wiring section; an inspection section for testing quality of the indoor units fully assembled at the front panel fixing section; and a packing section for packing and shipping the indoor units which have passed the quality test at the inspection section.

To achieve another object of the present invention, the present invention provides a method for assembling indoor units of dual-unit type air conditioner, the method comprising the steps of: assembling evaporators; completing assembly of the indoor units by assembling evaporators with other elements; performing quality test upon the indoor units; and packing the indoor units which have passed the quality test.

Preferably, the step of completing comprises the steps of: inputting the indoor units on which rear bodies and other elements are assembled; fixing evaporators to the indoor units; wiring the indoor units; and fixing front panels to the indoor units. It is possible to further comprise the steps of stocking a plurality of elements in a kit box, and conveying the kit box.

According to the present invention, indoor units are respectively assembled, tested, and packed on separate unit cells. Therefore, the manufacturer can meet the varying demands of the market simply by adjusting the number of unit cells.

BRIEF DESCRIPTION OF THE DRAWINGS

The above discussed object and advantages will be more apparent by from the following detailed description of preferred embodiments of the present invention with reference to the reference drawing accompanying, in which.

DETAILED DESCRIPTION OF THE PREFERRED EMBODIMENT

Figure 1:
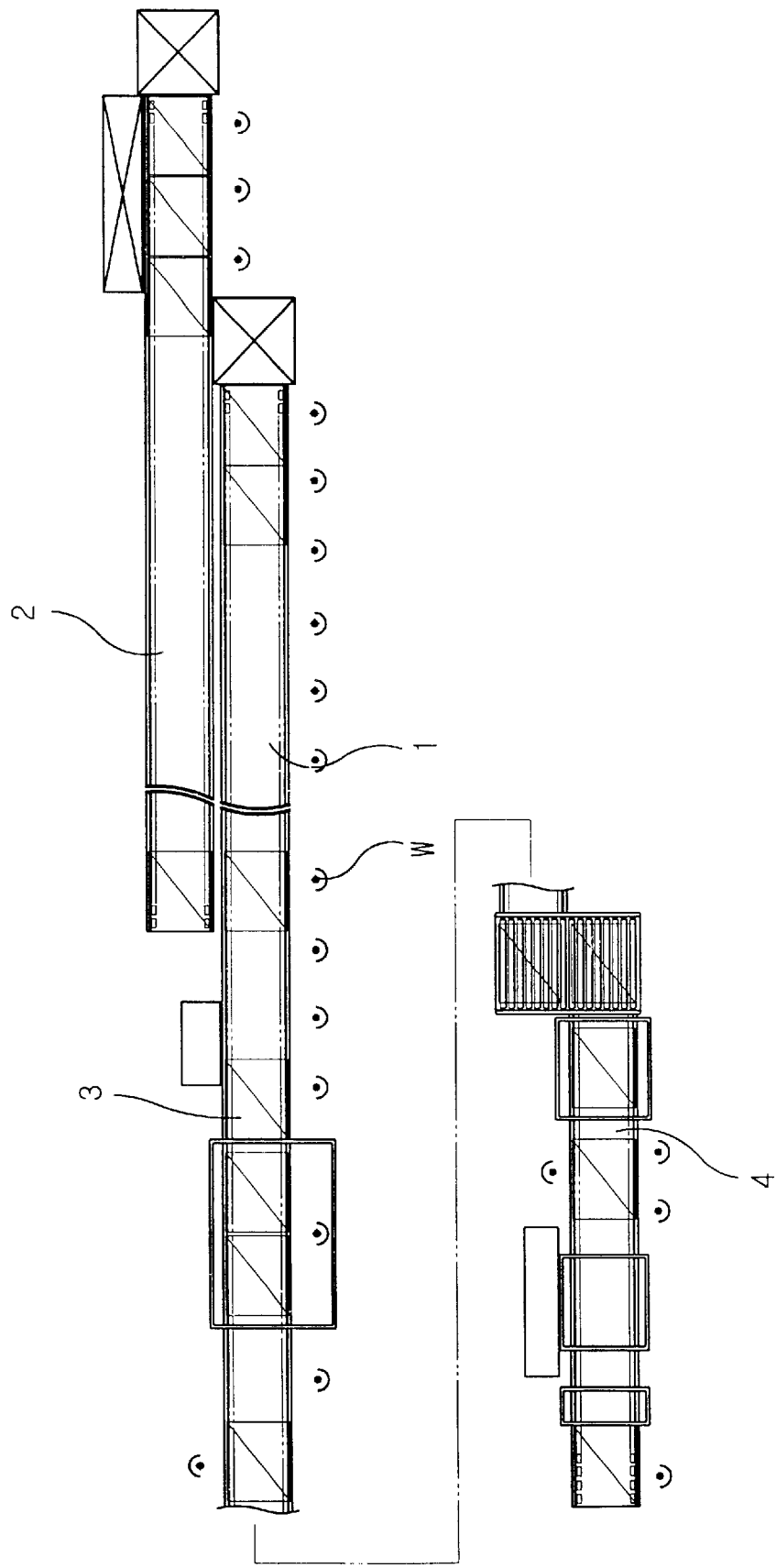
FIG. 1 is a schematic top plan view showing a conventional linear conveyor system on which indoor units of a dual-unit type air conditioner are manufactured.
Figure 2:
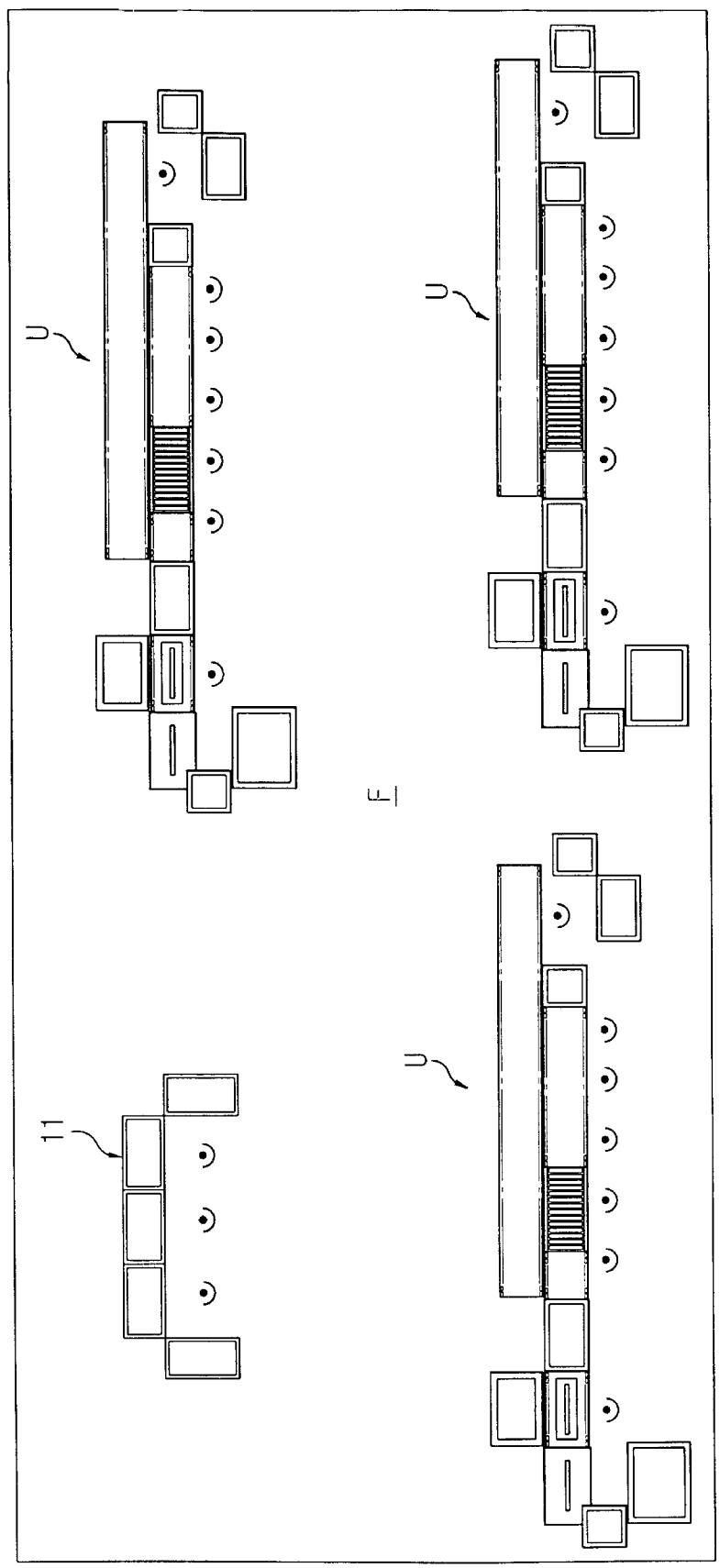
FIG. 2 is a schematic top plan view of a floor of a manufacturing facility showing a system for assembling indoor units of a dual-unit type air conditioner according to a first embodiment of the present invention.

First, an assembly system for producing indoor units of dual-unit type air conditioners according to a first embodiment of the present invention will be described with reference to FIG. 2.

As shown, the assembly system of indoor units of a dual-unit type air conditioner according to the first embodiment of the present invention includes an evaporator assembly section 11 for assembling evaporators. The assembly system also has three unit cells U to which evaporators assembled at the evaporator assembly section 11 are sent and assembled together with other elements to form the indoor units. The assembled indoor units undergo quality testing and are packed at the cell units U.

On the evaporator assembly section 11, elements of the evaporators are prepared, assembled by welding, and the assembled evaporators are inspected (i.e., quality tested).

Figure 3:
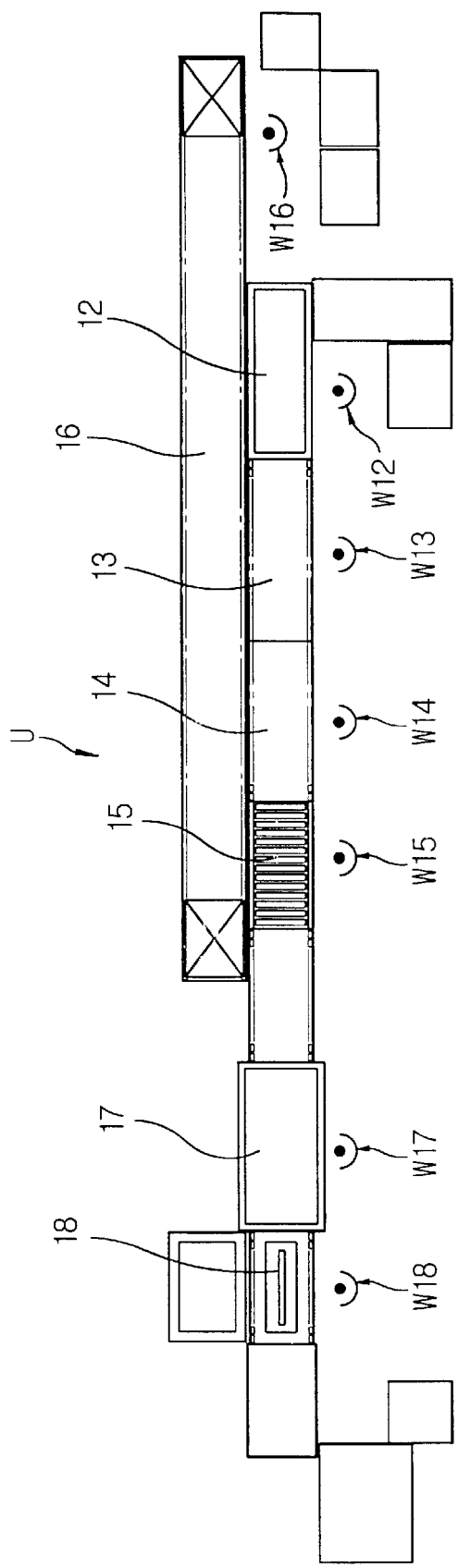
FIG. 3 is a schematic top plan view showing unit cell shown in FIG. 2 in greater detail.

FIG. 3 shows the unit cell U in greater detail. The unit cell U includes a rear body input section 12, an evaporator fixing section 13, a wiring section 14, a front panel fixing section 15, a kit box conveying section 16, an inspection section 17, and a packing section 18.

The sections for manufacturing the indoor units, which comprises the rear body input section 12, the evaporator fixing section 13, the wiring section 14, and the front panel fixing section 15 constitute individually drivable conveyors disposed on modules that are joined serially.

Quality tests are performed at the inspection section 17 which is positioned downstream of the front panel fixing section 15. The packing section 18 is positioned at the rear end of the inspection section 17. The kit box conveying section 16 extends from a front side of the rear body input section 12 to the front panel fixing section 15. Kit boxes containing elements of respective units are loaded on the kit conveying section 16 and conveyed from the rear body input section 12 to the front panel fixing section 15.

Described below is a method of assembling indoor units for dual-unit type air conditioners according to the first embodiment of the present invention.

Figure 4:
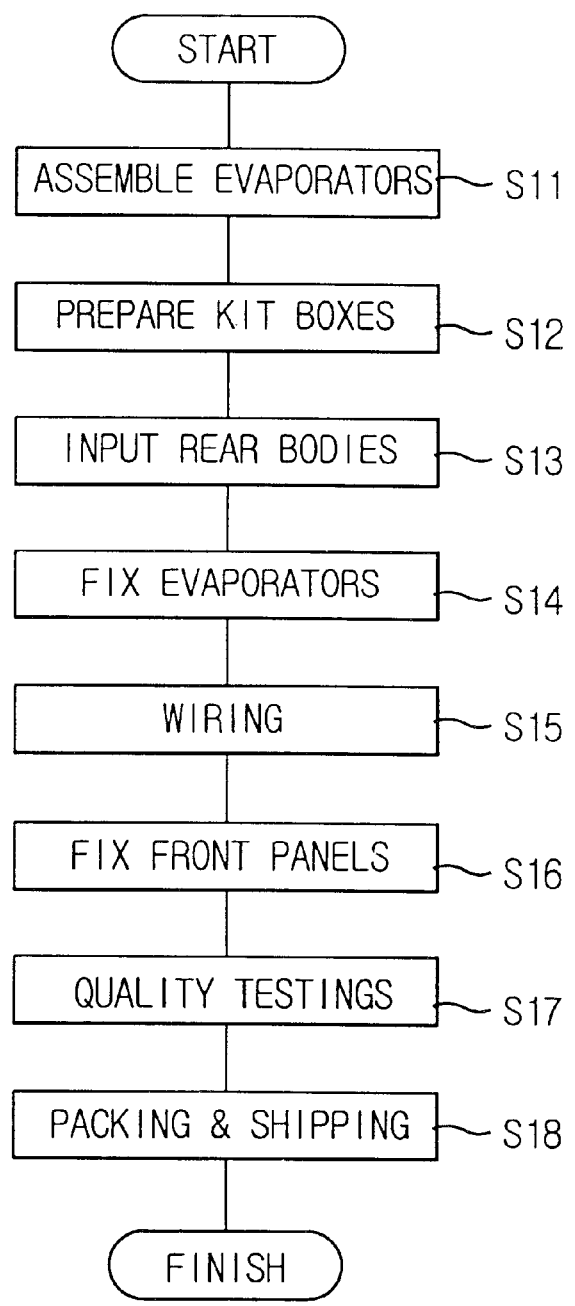
FIG. 4 is a flow chart showing a method for assembling indoor units of dual-unit type air conditioners according to the first embodiment of the present invention.

Evaporators that have been assembled and inspected at the evaporator assembly section 11. (Step S11 in FIG. 4). Three workers W are positioned for the those processes.

Initially on the unit cells U, elements of indoor units are stocked in each kit box at the kit box conveying section 16, and one worker W is positioned therefor (Step S12). Elements stocked on the kit box are then conveyed on the kit conveying section 16 alongside unit cell U from the rear body input section 12 to the front panel fixing section 15. Albeit not shown in the figures, kit boxes conveyed to the front panel fixing section 15 are returned to an input section of the kit conveying section 16 manually, or by separate means therefor.

Elements stocked in the kit box are assembled at the rear body input section 12 (Step S13), e.g. to make an initial structure having a rear body of an indoor unit.

The initial structure assembled at the section 12 are conveyed to the evaporator fixing section 13. Evaporators previously assembled at the evaporator assembly section 11 are now fixed on those structures (Step S14).

Intermediate structures containing the evaporators are then wired at the wiring section 14 (Step S15).

After the wiring process, the front panels are fixed on the intermediate structures at the front panel fixing section 15 (Step S16), whereupon the indoor units are completely assembled.

Fully assembled indoor units are conveyed to the inspection section 17 where they undergo a plurality of quality testing processes such as a withstand voltage test, a noise test, etc. (Step S17).

Indoor units that have passed the quality testing processes are then packed on the packing section 18 and shipped (Step S18).

Each of Steps S12 through S18 is performed by one respective worker W, respectively. Accordingly, seven workers W12–W18 are positioned along one unit cell U. If three units U are employed, then twenty-one workers are positioned along three unit cells U in all. Also, three workers W are positioned along the evaporator assembly section 11. Thus, twenty-eight workers W are required in total. Taking supporting work force into account, e. g., forklift drivers, supervisors, repairmen, etc., approximately thirty-two workers are required for the whole processes.

According to the first embodiment of the present invention, all the processes are separately performed on separate sections. Thus, less workers are required in the manufacturing system of the present invention than the same of related art in which all the processes are performed on one linear conveyor line.

Also, since indoor units are separately assembled on respective unit cells, the manufacturer can flexibly deal with the varying demands of the market. That is, one kind of indoor unit can be manufactured on all three unit cells, or different kinds of indoor units can be respectively manufactured on three unit cells. Also, if there is a demand for one kind of indoor unit in small quantities, the manufacturer can operate one unit cell therefor while stopping other two unit cells, so that the work force can be put into the other operations.

By adjusting a number of unit cells allotted in manufacturing respective models according to what is required, the manufacturer can flexibly deal with varying demands of the market.

Although the described first embodiment of the present invention depicts one evaporator assembly section 11 and three unit cells U, the number thereof can be varied in accordance with the need of the manufacturer.

Figure 5:
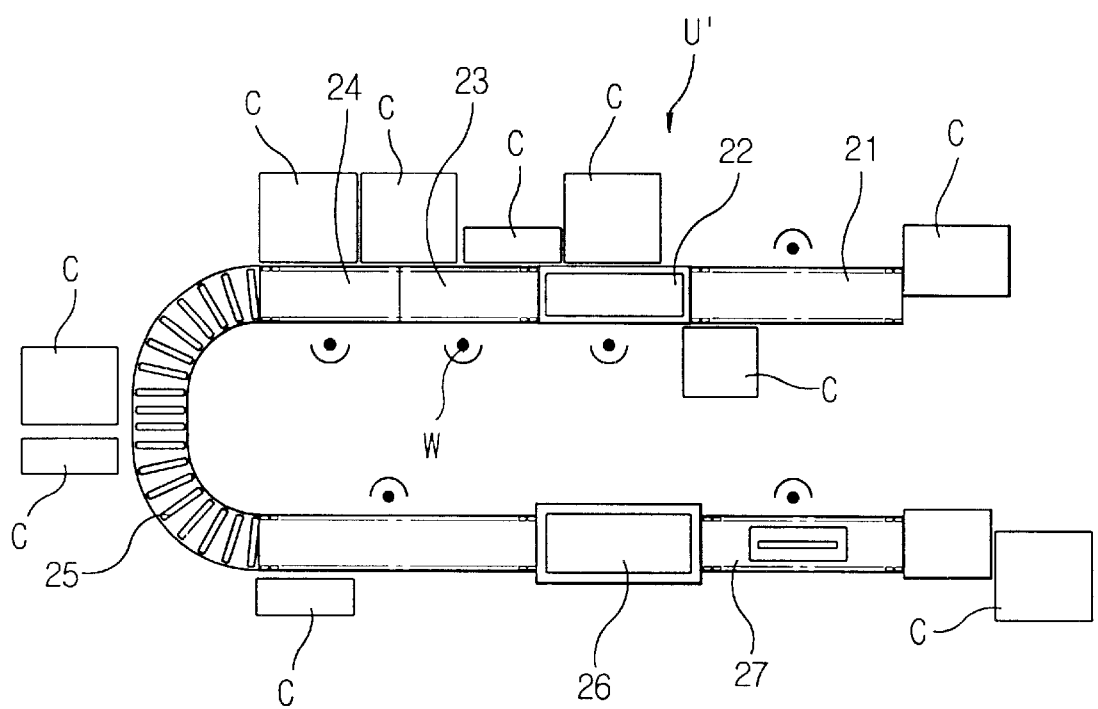
FIG. 5 is a schematic top plan view showing a unit cell of a system for assembling indoor units of dual-unit type air conditioners according to a second embodiment of the present invention.
Figure 6:
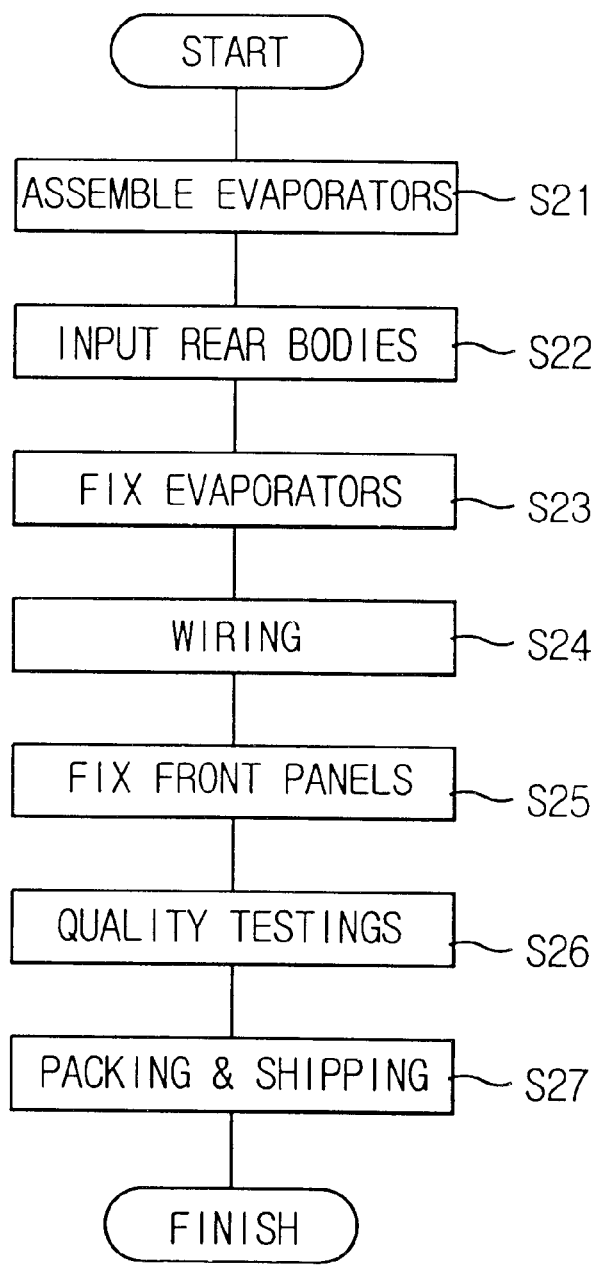
FIG. 6 is a flow chart showing a method for assembling indoor units of dual-unit type air conditioners according to the second embodiment of the present invention.

FIG. 5 shows a unit cell of a system for assembling indoor units of air conditioner according to a second embodiment of the present invention.

The indoor unit assembly system according to the second embodiment of the present invention comprises three unit cells U', only one of which is depicted in FIG. 5. Unlike the first embodiment, an evaporator assembly section 21 is included in each of the unit cells U'.

The unit cells U' comprises an evaporator assembly section 21, a rear body input section 22, an evaporator fixing section 23, a wiring section 24, a front panel fixing section 25, an inspection section 26, and a packing section 27.

Indoor units are sequentially assembled at the evaporator assembly section 21, the rear body input section 22, the evaporator fixing section 23, the wiring section 24, and the front panel fixing section 25. Fully assembled indoor units undergo quality testing processes at the inspection section 26, and indoor units that have passed the quality testing processes are packed at the packing section 27 and shipped.

As described, the second embodiment of the present invention is constructed in a similar manner as that of the first embodiment of the present invention. The unique aspect of the second embodiment of the present invention is as follows. The evaporator assembly section 21 is included in the unit cells U' instead of being separately positioned as in the first embodiment. The kit conveying section (designated by a reference numeral 16 in FIG. 4) for conveying kit boxes containing elements for making indoor units is excluded in the second embodiment. Instead those elements are stocked in parts areas C adjacent to the respective sections where assembly processes are performed.

According to the second embodiment of the present invention, each of the cell units is U-shaped, wherein the evaporator assembly section 21 and packing section 27 face each other. Accordingly, the space occupied by each cell unit according to the second embodiment is lessened by about 15% compare to the linear unit cells U of the first embodiment.

The method of assembly indoor units according to the second embodiment of the present invention is as follows.

First, evaporators are assembled at the evaporator assembly section 21 of unit cells U' (Step S21). Unlike the first embodiment, only one worker W performs the evaporator assembly process, since that worker only has to make enough evaporators to supply one cell unit.

Next, rear bodies are assembled at the rear body input section 22, so that the indoor units start to be assembled (Step S22).

Then, the rear bodies and the evaporators are conveyed to the evaporator fixing section 23, where the evaporators are assembled to the rear bodies (Step S23).

Then the wiring is performed at the wiring section 24 (Step S24).

After the wiring process, front panels are installed at the front panel fixing section 25 (Step S25), whereupon the indoor units are completed.

The fully assembled indoor units are now conveyed to the inspection section 26, wherein the indoor units go through quality testing processes such as a withstand voltage test, noise test, etc. (Step S26).

Indoor units that have passed the quality tests are conveyed to the packing section 27 where the indoor units are packed and shipped (Step S27).

Each of Steps S21 thorough S27 is activated by one respective worker W. Accordingly, seven workers W are positioned at one unit cell U', so twenty-one workers W at all are positioned at all three unit cells U'.

As in the first embodiment of the present invention, the indoor units are assembled on three unit cells by a few workers in the second embodiment. Thus, the manufacturer can flexibly adjust the amount of products produced in accordance with the varying demands of the market.

As described, indoor units are separately assembled, tested, and packed on respective unit cells. Accordingly, by adjusting the number of unit cells allotted to respective models, the manufacturer can flexibly deal with the variation in the number of products produced.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A system for assembling indoor air conditioner units, comprising:

an evaporator assembly section for assembling evaporators by preparing, welding, and testing the evaporators; and a plurality of unit cells separated from the evaporator assembly section, each having a conveying line, for assembling, testing and packing indoor air conditioning units, and a parts conveying section for conveying parts along and adjacent to the conveying line; the conveying line including a body assembling section for assembling bodies from the parts conveyed along the parts conveying section, an evaporator fixing section for receiving evaporators assembled at said evaporator assembly section and for fixing the evaporators to respective bodies received from the body assembling section, and a wiring section for wiring a unit comprised of one of the bodies and one of the evaporators attached thereto, the conveying lines being operable independently of one another.

2. The system as claimed in claim 1, wherein each parts conveying section comprises a kit box conveying section for conveying kit boxes at the same speed as the conveyor line, each kit box containing parts necessary for assembling one indoor air conditioner unit.

3. The system as claimed in claim 2, further including means for preparing, welding, and testing of the evaporators in the evaporator assembly section.

4. The system as claimed in claim 3 wherein the evaporator assembly section includes three work stations for accommodating three respective workers.

* * * * *